United States Patent Office 3,238,075
Patented Mar. 1, 1966

3,238,075
COMPACT ROUNDED GRANULAR TETRAZENE OF REDUCED SENSITIVITY AND METHOD OF PREPARATION INCORPORATING ANIONIC DISPERSING AGENTS
George William Charles Taylor, Waltham Abbey, Essex, Kenneth John Holloway, Welling, Kent, and Arwyn Theophilus Thomas, Orpington, Kent, England, assignors to Minister of Aviation, in Her Majesty's Government of the United Kingdom of Great Britain and Northern Ireland, London, England
No Drawing. Filed Mar. 13, 1964, Ser. No. 351,828
4 Claims. (Cl. 149—2)

This invention relates to explosive priming compositions and more particularly concerns methods of preparing such compositions which include granular tetrazene as a component thereof.

Tetrazene is an important ingredient of various sensitive priming compositions and its method of preparation by the reaction of sodium nitrite with aminoguanidine sulfate is well known. The product is in the form of a voluminous powder consisting of very small acicular crystals and fragments prone to twinning and aggregation. The tetrazene, as commercially supplied, presents considerable difficulties in drying, mixing and use as an ingredient of compositions which are associated with its unsatisfactory physical form and high sensitiveness. After transport under water to the filling factory, upon subsequent drying, the tetrazene would cake badly and become undesirably aggregative thus necessitating special means for eliminating objectionable lumps. Further, in the mixing and filling processes, the excessive amount of fines would yield poor flowing mixtures not amenable for use in automatic filling machines.

It is therefore an object of this invention to provide a free-flowing granular tetrazene.

Another object of this invention is to provide a granular tetrazene through improved methods of manufacture, the resulting tetrazene being devoid of the aforementioned disadvantages.

Other objects and features of the invention will become apparent as the invention is more fully hereinafter disclosed.

In accordance with these objects it has been discovered that the crystal form of tetrazene may be economically and efficiently converted into the granular form of the instant invention by incorporating certain additives into the process of manufacture. More specifically, certain additives having surface active properties, when incorporated into the process of manufacture of tetrazene have been found to control admirably the nucleation and growth thereof. The objectionable acicular and fragmented type of crystal is thereby eliminated so that the final product consists of rounded compact aggregates of "rosette" formation.

The additives which we have found to be effective are preferably anionic dispersing agents which are available commercially within the general group of sodium salts of high molecular weight alkylaryl sulfonic acids. For example, a sodium salt of a sulfonic acid derivative of di-, tri-, or tetranaphthyl methane, such as Belloid T.D. may be used. Specifically, Belloid T.D. is a polymethylene bis naphthalene sodium sulfonate and is a product of Geigy Chemical Corp., Ardsley, New York. The essential requirement is that the additive should have solid dispersing activity in a liquid medium including water. Such additives need not have wetting agent properties producing a reduction of surface tension at gas/liquid interfaces and indeed such properties may lead to foaming which is disadvantageous in explosives manufacturing.

The invention is illustrated by, but not limited to, the following example in which an anionic dispersing agent is used:

Example I

| | |
|---|---:|
| Aminoguanidine sulfate, g./l. | 250 |
| Belloid T.D., g./l. | 10 |
| Acetic acid, ml. glacial acetic acid/l. | 150 |
| Sodium nitrite, g./l. | 300 |

One liter of aminoguanidine sulfate aqueous solution together with 1200 ml. water, 15 ml. of the above acetic acid solution, 300 ml. of Belloid T.D. solution and 500 ml. of sodium nitrite solution are stirred together and the temperature raised slowly to 55° C. The temperature will rise as the reaction continues and further external heating becomes unnecessary. The tetrazene will precipitate, the temperature not being allowed to exceed 70°C. When the temperature has fallen to 40° C., after about 90 minutes, further evolution of gas will have ceased, the stirring, mechanical or manual, is now stopped and supernatant liquid decanted. The product is then washed with water and finally with alcohol before drying which may be carried out by either cold air or heating on a warm plate. The yield is 110–120 grams and consists of small rounded granules which will not cake upon drying, is free from acicular crystals and fragments, and mixes well with other ingredients to give good flowing compositions.

Other dispersing agents have been used successfully in our process, for example, Dispersol T, a disodium salt of methylene bis (naphthalene sulfonic acid), a product of Imperial Chemical Industries Ltd., 149 Park Lane, London W. I, England.

Example II

| | |
|---|---:|
| Aminoguanidine sulfate, g./l. | 250 |
| Dispersol T, g./batch | 30 |
| Acetic acid, g. glacial/l. | 150 |
| Sodium nitrite, g./l. | 300 |

For a production yield of about 2½ pounds, the reaction will be suitably carried out in a 10 gallon stainless steel jacketed vessel with stirrer. Ten liters of aminoguanidine sulfate aqueous solution, 30 g. Dispersol T, 5 liters of sodium nitrite solution and 0.15 liter of acetic acid solution are added, stirred, and the temperature of the circulating water adjusted to 50–55° C. The reaction will proceed for 60–65 minutes, the temperature of the contents of the vessel not rising to above 60° C. After cooling to 30° C. in 7–10 minutes by circulation of cold water through the jacketed vessel, the product will be separated from the mother liquor and washed with water by decantation and then finally washed with alcohol. The washed product is then dried by passage of cold dry air, or, alternatively, by exposure on a hot plate, the temperature not exceeding 50° C. The resultant product consists of discrete granules having not the slightest tendency to cake or cling.

We claim:

1. A process for the manufacture of granular tetrazene comprising reacting a soluble nitrite, aminoguanidine sulfate in aqueous solution and acetic acid in the presence of an anionic dispersing agent, said tetrazene having the shape of rounded granules which are free from acicular crystals and fragments and mix well with other ingredients to give free flowing explosive compositions.

2. A process as described in claim 1 further characterized by said anionic dispersing agent being selected from the group consisting of polymethylene bis naphthalene sodium sulfonate and disodium salt of methylene bis (naphthalene sulfonic acid).

3. A process for the manufacture of granular tetrazene comprising stirring together one liter of aminoguanidine sulfate aqueous solution in a proportion of about 250 g./l. with 1200 ml. water, 15 ml. of acetic acid in a proportion of about 150 ml. glacial acetic acid/l., 500 ml. of sodium nitrite solution in a proportion of about 300 g./l. and 300 ml. of polymethylene bis naphthalene sodium sulfonate in a proportion of about 10 g./l. to form a solution, raising the temperature of said solution to about 55° C., precipitating tetrazene at a temperature not exceeding 70° C., cooling the resultant mass to about 40° C., decanting supernatant liquid and washing and drying the tetrazene to form rounded, non-acicular fragment-free tetrazene.

4. A tetrazene of reduced sensitivity having compact rounded granules of free-flowing shape, said tetrazene being formed by reacting a soluble nitrite, aminoguanidine sulfate in aqueous solution and acetic acid in the presence of an anionic dispersing agent.

References Cited by the Examiner

Military Explosives, TM9–1910, TO 11A–1–34, Depts. of Army and Air Force, April 1955, pages 96 and 110–113 (UF, 523 A51).

LEON D. ROSDOL, *Primary Examiner.*

CARL D. QUARFORTH, *Examiner.*

BENJAMIN R. PADGETT, *Assistant Examiner.*